United States Patent
Grosshart et al.

(10) Patent No.: US 10,119,712 B2
(45) Date of Patent: Nov. 6, 2018

(54) ROOM CONDITION MONITORING SYSTEM

(71) Applicant: SETRA SYSTEMS, INC., Boxborough, MA (US)

(72) Inventors: Paul Francis Grosshart, Bedford, MA (US); Gino Amaro Pinto, Milford, MA (US); Eric Christopher Beishline, Marlborough, MA (US); Sunil Barot, Nashua, NH (US); Kevin Bourbeau, Pepperell, MA (US); Anthony T. Batista, Milford, MA (US); Shawn Oscar Henry, Pepperell, MA (US); Brandon Thomas Rogers, Boston, MA (US); Bernard A. Manning, II, Sterling, MA (US)

(73) Assignee: Setra Systems, Boxborough, MA (US)

( * ) Notice: Subject to any disclaimer, the term of this patent is extended or adjusted under 35 U.S.C. 154(b) by 132 days.

(21) Appl. No.: 15/299,980

(22) Filed: Oct. 21, 2016

(65) Prior Publication Data
US 2017/0115022 A1  Apr. 27, 2017

Related U.S. Application Data

(60) Provisional application No. 62/244,596, filed on Oct. 21, 2015.

(51) Int. Cl.
*G06F 19/00* (2018.01)
*F24F 11/00* (2018.01)
(Continued)

(52) U.S. Cl.
CPC .......... *F24F 11/0012* (2013.01); *F24F 11/30* (2018.01); *F24F 2110/10* (2018.01);
(Continued)

(58) Field of Classification Search
CPC ..... G01L 19/34; H05K 5/0017; F24F 11/0012
(Continued)

(56) References Cited

U.S. PATENT DOCUMENTS

| | | |
|---|---|---|
| 5,528,215 A | 6/1996 | Slu et al. |
| 6,167,316 A | 12/2000 | Gloudeman et al. |

(Continued)

FOREIGN PATENT DOCUMENTS

WO  2014124353 A1  8/2014

OTHER PUBLICATIONS

Setra Systems, Inc, "Model SRCM Operation", Apr. 2015, 42 pages.
Setra Systems, Inc, "Model SRCM Room Condition Monitor", Dec. 2013, 2 pages.

*Primary Examiner* — Edward Raymond
(74) *Attorney, Agent, or Firm* — Beusse Wolter Sanks & Maire; Robert L. Wolter

(57) ABSTRACT

A room condition monitor (RCM) that includes a processor with an embedded router software object that is in signal communication with a first communication connector including BACnet/IP interface for the transmission receipt of data packages over a building management system (BMS) communication network according to a BACnet/IP protocol. The RCM also includes a room condition sensor for detecting a room condition. In addition, the RCM includes a projected capacitive LCD screen display to display information regarding the detected room condition, or other building information associated with the BMS. A second communication connector with a second network protocol interface is provided for communication with network legacy devises through the RCM router.

32 Claims, 10 Drawing Sheets

(51) Int. Cl.
*F24F 11/30* (2018.01)
*F24F 110/10* (2018.01)

(52) U.S. Cl.
CPC .............. *G05B 2219/23258* (2013.01); *G05B 2219/25168* (2013.01); *G05B 2219/2614* (2013.01)

(58) Field of Classification Search
USPC .......................................... 702/188, 182–185
See application file for complete search history.

(56) References Cited

U.S. PATENT DOCUMENTS

| | | | |
|---|---|---|---|
| 6,595,430 B1 | 7/2003 | Shah | |
| 6,967,565 B2 | 11/2005 | Lingemann | |
| 6,995,518 B2 | 2/2006 | Havlik et al. | |
| D520,386 S | 5/2006 | Takach et al. | |
| 7,114,554 B2 | 10/2006 | Bergman et al. | |
| 7,181,317 B2 | 2/2007 | Amundson et al. | |
| 7,306,165 B2 | 4/2007 | Shah | |
| 7,222,494 B2 | 5/2007 | Peterson et al. | |
| 7,225,054 B2 | 5/2007 | Admundson et al. | |
| 7,242,972 B2 | 9/2007 | Admundson et al. | |
| 7,360,717 B2 | 4/2008 | Shah | |
| 7,636,604 B2 | 11/2009 | Bergman et al. | |
| 7,693,582 B2 | 4/2010 | Bergman et al. | |
| 7,904,186 B2 | 3/2011 | Mairsea | |
| 7,917,232 B2 | 3/2011 | McCoy et al. | |
| 8,024,054 B2 | 9/2011 | Mairs et al. | |
| 8,275,918 B2 | 9/2012 | Borbeau et al. | |
| 8,359,929 B2 | 1/2013 | Borbeau et al. | |
| 8,503,183 B2 | 8/2013 | Hamilton et al. | |
| 2010/0256788 A1* | 10/2010 | Bourbeau | G01L 19/14 700/90 |
| 2013/0073093 A1 | 3/2013 | Songkakul | |
| 2013/0086195 A1 | 4/2013 | Hinker | |
| 2014/0197960 A1 | 7/2014 | Koo | |

\* cited by examiner

ROOM CONDITION MONITORING SYSTEM

CROSS-REFERENCE TO RELATED APPLICATIONS

This application claims the benefit of prior U.S. Provisional Application No. 62/244,596 filed Oct. 21, 2015, the content of which is hereby incorporated by reference.

FIELD OF THE INVENTION

This invention relates generally to automated building management systems and communication networks associated with such systems. This invention is also related to room condition monitoring systems that are components of a building management system.

BACKGROUND OF THE INVENTION

Building Management Systems (BMS) or Building Automation Systems (BAS) are computerized control systems installed in buildings for controlling and monitoring a building's mechanical and electrical equipment such as ventilation, lighting, power systems, fire systems, and security systems.

A BMS typically includes a communication network including software and hardware systems networked to control and monitor various parameters of a building's operation. The software program of a BMS is configured to use one or more of a variety of different protocols, including proprietary protocols such as P1 or N2. Also available are BMSs that integrate using internet protocols and open standards such as DeviceNet, SOAP, XML, BACnet, ARCnet, LonWorks, Profibus and Modbus. These communication networks interface, for example, with room condition monitoring systems, including room pressure monitors, temperature monitors, and humidity monitors, for example. Unfortunately, because of the variety of communications protocols, legacy devices and the expense of running new wiring for local devices to remote sensors, interfacing between a BMS and other devices can be difficult and expensive.

There are numerous room condition monitors available from various vendors or suppliers in the market today. Features that have become standard for room condition monitors include pressure sensors and BACnet MS/TP connections for communication between network devices according to a BACnet MS/TP protocol. A BACnet MS/TP connection is a RS485 twisted pair hardware interface. Compared to an Ethernet carried network traffic the BACnet MS/TP networks are relatively slow; however, the attractiveness of this type of network is the long distance gained between network connections.

The BACnet/IP protocol includes a hardware interface upgrade relative to the BACnet MS/TP interface and protocol. The connectivity of a BACnet/IP network uses the same equipment as standard IT equipment; however, current routers are not programmed to understand the BACnet/IP network traffic. Accordingly, there is a special routing function programmed into routers that encapsulates network traffic so it can be passed across normal routers. The BACnet/IP protocol is a tremendous advantage in the speed of data transfer providing good response times to changing building operating set points; however, current room conditions monitors are not BACnet/IP enabled. In order to connect these monitors to a BMS communication network, existing routers have to be further programmed to incorporate the monitors into a BMS communication network in order to transmit data associated with the room condition monitor according to a BACnet/IP protocol.

Another limitation of the existing room condition monitors resides in the user interface. More specifically, current monitors include touch screen interfaces with resistive touch screen technology. However, this technology presents a few problems, namely resistive touch screens do not allow advanced gesturing to facilitate easier user interface and they are not compatible with gloved hands to be used in critical applications.

Existing resistive touch screens are generally limited to a one touch point on the screen. In many critical environments such as a wet lab, a hospital isolation room or operating room, clean rooms, pharmaceutical manufacturing facilities or asbestos abatement projects, the end user will need to interact with the room condition monitor. In such operating environments personnel typically wear protective garments including gloves. With resistive or standard capacitive display technology the end users need to either take off his/her protective gloves or use a stylus, which may become lost if not attached somehow to the monitor. In addition, resistive touch screens are often times damaged due to relatively soft polyester films as the top layer.

Projected capacitive display screen technology is available on personal devices such as cellular phones and tablet computers. This technology enables an end user to slide a finger, stylus or other compatible pointing device across the screen in a horizontal or vertical motion to identify and select software application, change the screen that is viewed or bring up a menu for changing parameters on the screen for the user. Additionally, zoom functions are provided to expand a particular area of an image. Heretofore, the projected capacitive display screen technology has not been incorporated in display screens for room condition monitors.

Accordingly, a need exists for room condition monitors that are compatible with advanced and upgraded BMS communication networks, without the need of reprogramming the BMS software to incorporate these monitors into the BMS. In addition, a need exists for a room condition monitor that includes a user interface that provides a simple and intuitive method of communication with a room condition monitor.

SUMMARY OF THE INVENTION

The new and novel room condition monitor or room condition monitoring system described herein is typically used for room environment condition monitoring. Advantageously, this enables building upgrades or new building construction efforts to utilize BACnet/IP for their main communication backbone and utilize software including a BACnet router or a local BACnet controller that can communicate to other networked devices without using the building's network. While using the monitor with the room monitoring application for isolation rooms, the monitor can also provide BMS network awareness to connect to legacy BACnet MS/TP or non-BACnet devices to the BMS through a monitor network connection.

Accordingly, an embodiment of a room condition monitoring system comprises a housing defining an interior volume and an opening to the interior volume, wherein the housing supports operating electrical components, which include a processor. The monitoring system has a display module including a frame attached to the housing and a display screen affixed to the frame and the display screen is in signal communication with one or more of the electrical components. The monitor also includes a room condition sensor in signal communication the processor, which is configured to process the signals received from the sensor and generate data representing the detected condition of the room. In a preferred embodiment the monitor or system includes at least one communication connector including a BACnet/IP interface in signal communication with a building management system (BMS) including a BMS communication network according to a BACnet/IP protocol. The router is programmed to transmit the data from the processor over the BMS network according to the BACnet/IP protocol or receive signals over the BMS network according the BACnet/IP protocol.

In another embodiment, the router is in signal communication with a BMS communication network according to a first network protocol and the router is configured to generate one or more data packages according to the first network protocol based on the data received from the processor or other I/O devices. The BMS may include a plurality of input/output (I/O) devices one or more of which is in signal communication with the processor or router, and the router is configured to transmit one or more data packages according to the first network protocol based on signals received from one or more of the I/O devices at the processor or router. The monitor may further include a second communication connector in signal communication with the router, wherein the connector is configured to transmit or receive data packages according to a second network protocol.

In another aspect of the invention, the room condition monitor comprises a first housing defining a first interior volume, wherein the first housing supports operating electrical components. A display module includes a frame attached to the first housing and a display screen affixed to the frame and the display screen is in signal communication with one or more of the electrical components. In a preferred embodiment the display screen includes a projected capacitive touchscreen.

The monitor may also include a first electrical connector mounted to the first housing, and a sensor module is detachably securable to the first housing. The sensor module comprises a second housing defining a second interior volume, and a sensor is supported within the second interior volume and the sensor is configured to detect a condition of a room in a building. A second electrical connector that is on the sensor module is detachably securable to the first electrical connector, wherein the second electrical connector is in electrical communication with the sensor and the operating electrical components to provide signal communication between sensor and electrical components, when the first and second electrical connectors are secured together and the sensor module is affixed to the first housing. The operating electrical components include a processor in signal communication with the sensor and the display screen, and the processor is configured to generate data associated with the condition of the room detected by the sensor.

In an embodiment, that may or may not include the above detachable sensor module, the monitor may include a hinge mechanism connected to the first housing and the display module wherein the hinge mechanism has a first arm pivotally connected to a first side of the housing and the first arm is connected to the display module and a second arm pivotally connected to a second side of the housing and second arm is connected to the display module, wherein the first arm and second arm share a common first pivot axis on the housing to displace the display module outward and downward or upward, or outward and lateral relative to the opening of the housing depending on the orientation of the display module and the housing. An electrical line connecting the display screen to the processor is extendible so the display screen is operational when the display module is opened for servicing the monitor.

DETAILED DESCRIPTION OF THE INVENTION

Figure 1:
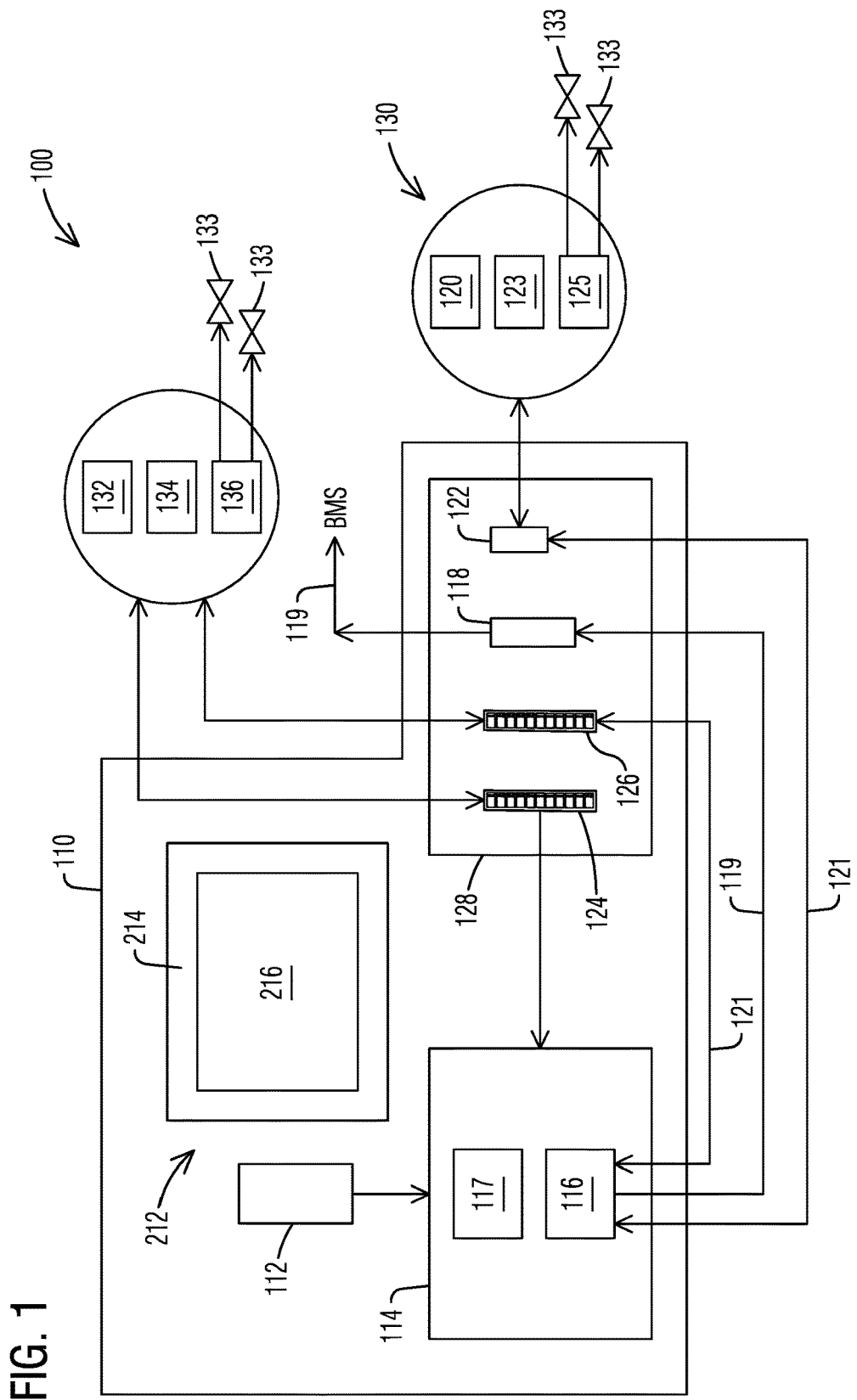
FIG. 1 is a schematic illustration of a building management system including a room condition monitor according to aspects of the invention.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the preceding definitions are provided. It is further noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item.

In reference to FIG. 1, a room condition monitor 110 (RCM 110) is shown as a component of a building management system (BMS) 100 that transmits information over a communication network according to a first network protocol. By way of example, the first network protocol may be an Ethernet-based protocol such as BACnet/IP.

The RCM includes a sensor 112 for detecting and monitoring a room condition. The sensor for example may include a pressure transducer that detects a pressure within a room, or a pressure differential between a first room and a second room within a building. Examples of pressure transducers may include Setra Models 264, 265 and 267, which for critical spaces such as hospital isolation rooms, have 0.25" WC full scale range and about 0.25% accuracy. However, the invention is not so limited and may encompass one or more sensors that detect other room conditions such as temperature or relative humidity, for example.

As further shown schematically, the sensor 112 is in signal communication with a processor 114, which is programmed to generate data indicative of the detected room condition. The term "processor" as used herein means the electronic circuitry that carries out executable instructions of a computer program according to arithmetic, logic, control and input/output (I/O) operations as specified by the instructions. For example, the processor 114 may be programmed to perform as a proportional-integral-derivative (PID) controller to compare a detected or measured pressure differential between two rooms to pressure differential lower and upper thresholds, and transmit signals in response to a detected pressure differential above or below the thresholds. In the event the detected pressure or pressure differential is not within prescribed upper and lower thresholds alarms may be activated by the processor or signals are transmitted to a building HVAC control device to adjust the pressure or pressure differential in the room. The processor may be system on module (SOM) sold by Toradex.

Signal communication as used means electrical communications including the transmission and receipt of analog or digital signals.

As will be explained in more detail below the RCM 110 includes a display module 211 including a display screen 216 affixed to a frame 214 which is connected to a housing 215. The display screen is preferably an LCD touchscreen including projective capacitive technology as described below in more detail. Such a display screen is sold is known to those skilled in the art and sold by many established vendors.

Operating electrical components including the processor 114 and embedded circuitry comprising a router 116 are supported within the housing. The processor 114 is in signal communication with a display screen processor to display information relative to room conditions. Accordingly, the processor 114 further comprises a memory device 117 such as a flash memory to store data related to the detected room condition and room condition thresholds. The memory device 117 may also include executable instructions performed by the processor 114 for processing signals received from the sensor or other I/O devices.

As indicated above, the processor 114 may include a router 116 as a software object and the router 116 is in signal communication with a first communication connector 118 including a first network protocol interface to transmit or receive signals associated with the detected room condition and other BMS information according to a first network protocol 119. For example, for network traffic transmitted according to a BACnet/IP protocol, the first communication connector 118 or communication interface may be an RJ45 connector.

Thus at least with respect to the embodiment of FIG. 1, analog signals generated by sensor 112 are transmitted to the processor 114, which, according to stored executable instructions generates data indicative of the detected room condition. This room condition data may be transmitted to an SOM processor for display on the display screen. In addition, the room condition data is transmitted to the router 116, which generates a data package including the room condition data and a destination address and the data package is transmitted over the BMS communication network according to the BACnet/IP protocol, or first network protocol 119.

The terms protocol and network protocol shall mean the standards or set of rules that end points in a telecommunication connection use when they communicate, and specify interactions between communicating entities. As used herein protocols and network protocols shall include sets of rules or standards for data interchange at a hardware device level and protocol data interchange at an application program level. For example, BACnet is a known protocol that includes BACnet/IP which includes communication hardware for transmission over the Ethernet. In addition, BACnet MS/TP includes communication hardware that is different than BACnet/IP communication hardware; however, both of these protocols include the same standards with respect to data interchange at the software application level, but utilize different communication hardware at communication physical level. The BACnet/IP protocol at the physical level utilizes an RJ45 connector standard and BACnet MS/TP follows the RS485 connector standard.

Again in reference to FIG. 1, the BMS 110 may include one or more input/output (I/O) devices 120, 123, 125 such as sensors, controllers etc and communication hardware for transmission according to a second network protocol 121, such as a BACnet protocol; however, the communication hardware is not BACnet/IP compatible, or compatible with the first network protocol 119. Such I/O devices may be referred to as legacy devices and with respect to prior art BMSs that include BACnet/IP as its communication backbone, it is necessary to program existing routers to interface or link these legacy devices to the BACnet/IP network. For example, the input/output (I/O) devices 120, 123, 125 may be linked or interfaced with BACnet MS/TP communication hardware for transmission of data packages according to the BACnet MS/TP protocol.

Accordingly, the RCM 110 includes at least one second communication connector 122 associated with these legacy I/O devises 120, 123, 125. For BACnet MS/TP I/O devices 120, 123, 125 the second communication connector is an RS485 connector. Thus, the I/O devices 120, 123, 125 are in signal communication with the router 116 via the second communication connector 122 for transmission of data associated with a room condition, for example, if one or more of the devices 120 is a room condition monitor. The data may also include data associated with an identification of the room being monitored, and the date and time of a detected room condition. Alternatively, to the extent the one or more of the devices 120 is a controller, the data may indicate the status of certain hardware, such as valves in an open or closed position. Any information received according to the second network protocol 121 may be stored in the memory device 117 and accessible via the display screen 116.

The router 116 is configured, in response to signals received from one or more of the I/O devices 120, 123, 125 to generate one or more data packages that include a destination address. These data packages are then transmitted over the BMS via the first communication connector 118 and according to the first network protocol 119. Conversely, signals received over the first communication connector 118 at the router 116 according to the first network protocol may be reconfigured by the router 116 for transmission via the second communication connector 122 to the I/O devices 120, 123, 125 according to the second network protocol 121. For example, the BMS may transmit signals that indicate some action required to control actuation of valves 133 of an HVAC system to control pressure in a room or a pressure differential between two rooms in response to signals generated by one of the I/O devices 120.

Again in reference to FIG. 1, the RCM 110 may include an I/O connector module 124 that includes one or more analog I/O connectors 126 and/or one or more digital I/O connectors 124. As further shown, the BMS may include a second set 130 of I/O devices 132, 134, 136 that are in signal communication with the processor 114 and router 116 via connectors 124 or connectors 126 depending on whether the signals are analog signals or digital signals. The I/O devices 132, 134, 136 may include sensors 132, 134 and/or controllers 136, by way of example.

The sensors 132, 134 may transmit analog signals to the processor 114 via the analog connectors 126 and the processor 114 is programmed to generated a digital data output, which is transmitted to the router 116. The router 116 then generates and transmits one or more data packages that include, for example, data representing a detected room condition and a destination address, according to the first network protocol 119.

The digital connectors 126 link digital output from I/O devices 132, 134, 136 to the router 116 which is programmed to translate this input and transmit data packages over the BMS communication network according to the first network protocol 119, which as explained above may be BACnet/IP. For example, devices may transmit data according to a third network protocol, such as ARCnet, and the router 116 is configured to translate these data packages and transmit one or more data packages according to a BACnet/IP protocol. Conversely, the router 116 is capable of converting data packages received according to the BACnet/IP protocol and transmit one or more data packages according to the third network protocol, which may be ARCnet, for example.

Figure 2:
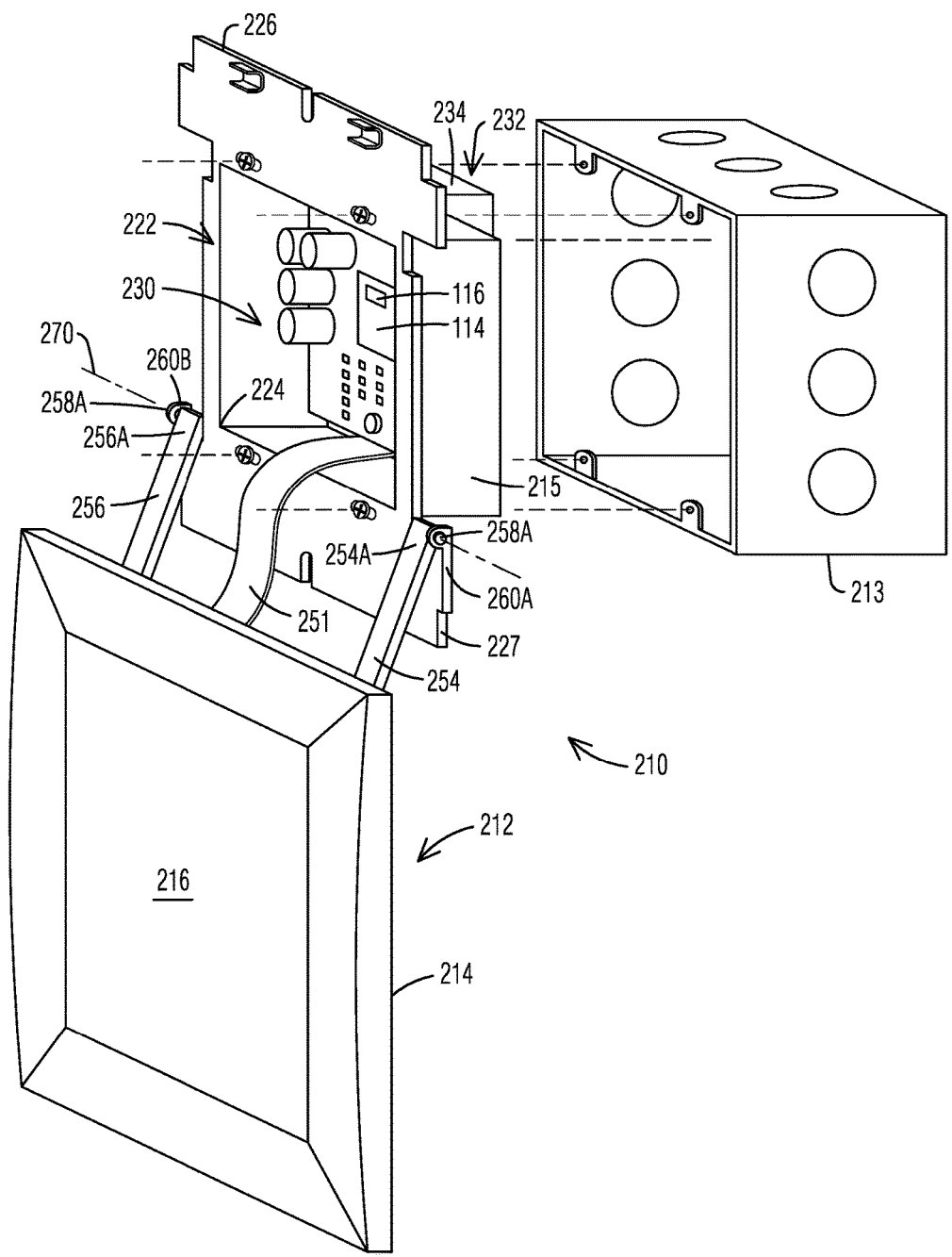
FIG. 2 is a front perspective view of a room condition monitor with a display module opened in a servicing position.

Thus, the above-described RCM 110, which includes sensor 112 in signal communication with a processor 114 having a router 116, which in turn is configured to generate and transmit one or more data packages responsive to signals generated by the sensor and the data packages are configured according to a first network protocol. The one or more data packages include data representing a detected of a room condition. The RCM 110 also interfaces with non-network devices and/or legacy devices via communication connectors or legacy devices for communication between the BMS communication and these non-network devices and/or legacy devices An embodiment of the invention is further illustrated FIGS. 2 and 3, which show perspective views of a room condition monitor 210 according to aspects of the invention. The monitor 210 has a display module 212 including a frame 214 and display screen 216. In FIG. 2, the display module 212 is shown in an open or servicing position providing access to electrical components 230, which includes at least one processor 114. With respect to FIG. 3, the display module 212 and display screen 214 are shown in a closed or operating position.

Again with respect to FIG. 2, a flexible electrical line or ribbon 255 is in electrical communication with a display processor (not shown) at the display screen 214 and the processor 114. In this manner, the display screen 214 remains in electrical communication with the processor 114 so a technician that is servicing the monitor 210 (for example calibrating the monitor 210) may view the display screen 214 read outs.

The term "display screen" is used herein to refer to an active electrical component that responds to an electronic signal and provides a visual or other humanly perceptible output, and it may include printed circuit board elements, thin film transistors (TFT), a liquid crystal display (LCD) or other desired type of input/output that may be interactive and communicate with components 230 either wirelessly or by a flexible or extendable electrical line or ribbon 255.

In a preferred embodiment, the display screen 216 incorporates projected capacitive touch technology. By utilizing capacitive or projected capacitive touch technology, multiple touch points can be integrated into the design as well as advanced gesturing such as swiping across the screen, two finger touch to zoom out. In addition, in many critical environments such as a wet lab, hospital isolation room or operating room, the end user will need to interact with the room condition monitor. With resistive or standard capacitive display technology the user needs to either remove their protective gloves or use a stylus, which may become lost if not attached somehow to the unit.

By specifically using projected capacitive touch technology, the user can operate the unit without having to take off their insulating (latex or other similar material) gloves. A projected capacitive (PCAP) display screen can also provide the end user additional benefits over resistive touch screens. Resistive touch screens are often times damaged due to relatively soft polyester films as the top layer. PCAP displays typically have a complete glass top layer that is both highly chemical resistant, which is helpful in a bio safety laboratory or a vivarium where wash-downs with harsh chemicals is needed, as well as more resistant to physical damage.

In accordance with aspects of this invention, the display screen provides a new method to interact with critical care user interfaces and building automation displays. Users can slide their hand/finger across a display to interact with building automation display mounted on walls. For ease of use, the user interface is configured to provide a simple and intuitive method of communicating with the room monitoring system. Users are able to slide a finger, stylus or other compatible pointing device across the screen in a horizontal or vertical motion. This allows the application to change the screen that is viewed or bring up a menu for changing parameters on the screen for the user.

For example, the application utilizes a left to right motion for an action such as change screen and utilizes an up to down motion for menu appearance or to go to a configuration screen. The swipe could also interact only on items touched to change the selection in that area of the screen.

Further, slide finger and tap to change settings may be used. The user is able to change parameters without typing values with a keyboard format, instead adjusting them with multiple resolution control methods. For example, the user slides an indicator by touching the screen and sliding across the screen to adjust a parameter and executes taps at an icon on either end to increment the settings with finer resolution than the slide action. Holding the finger down on these starts an incrementing function of the parameter that can change speed of incrementing the longer it is held.

A zoom function to expand a particular area of a display by using two fingers is also provided. The user is able to expand a section of the building automation graphic display by touching two points and dragging fingers apart. This allows looking at very small areas of text or graphical output to better discern or see more details than a normal viewing. A linear graph showing a long time trend could be expanded to show detail not viewable at the initial screen resolutions. For example, thousands of points may be plotted where the screen only has 480 pixels vertically and expanding the scale around the line being plotted will show the detail that is lost due to low resolution.

Figure 3:
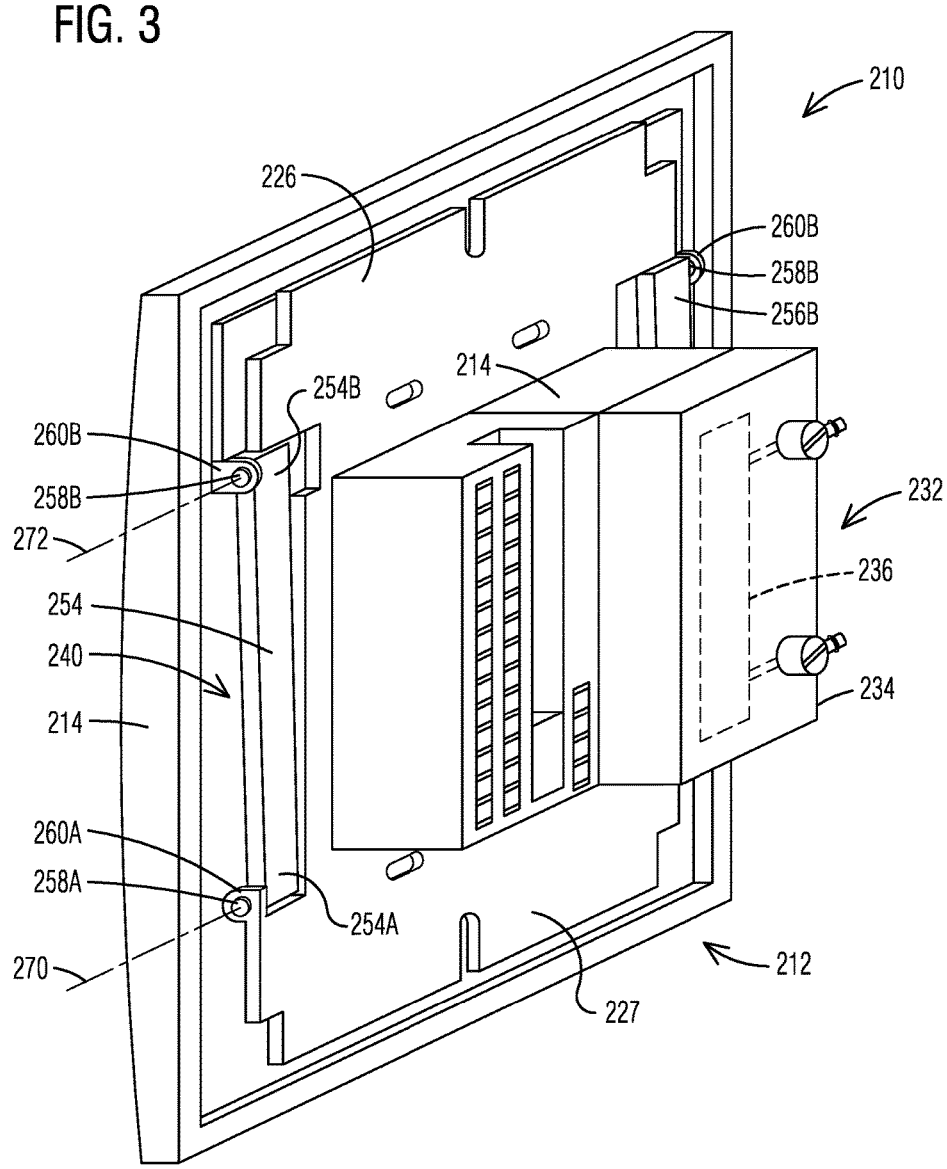
FIG. 3 is a rear perspective view of the room condition monitor.
Figure 4:
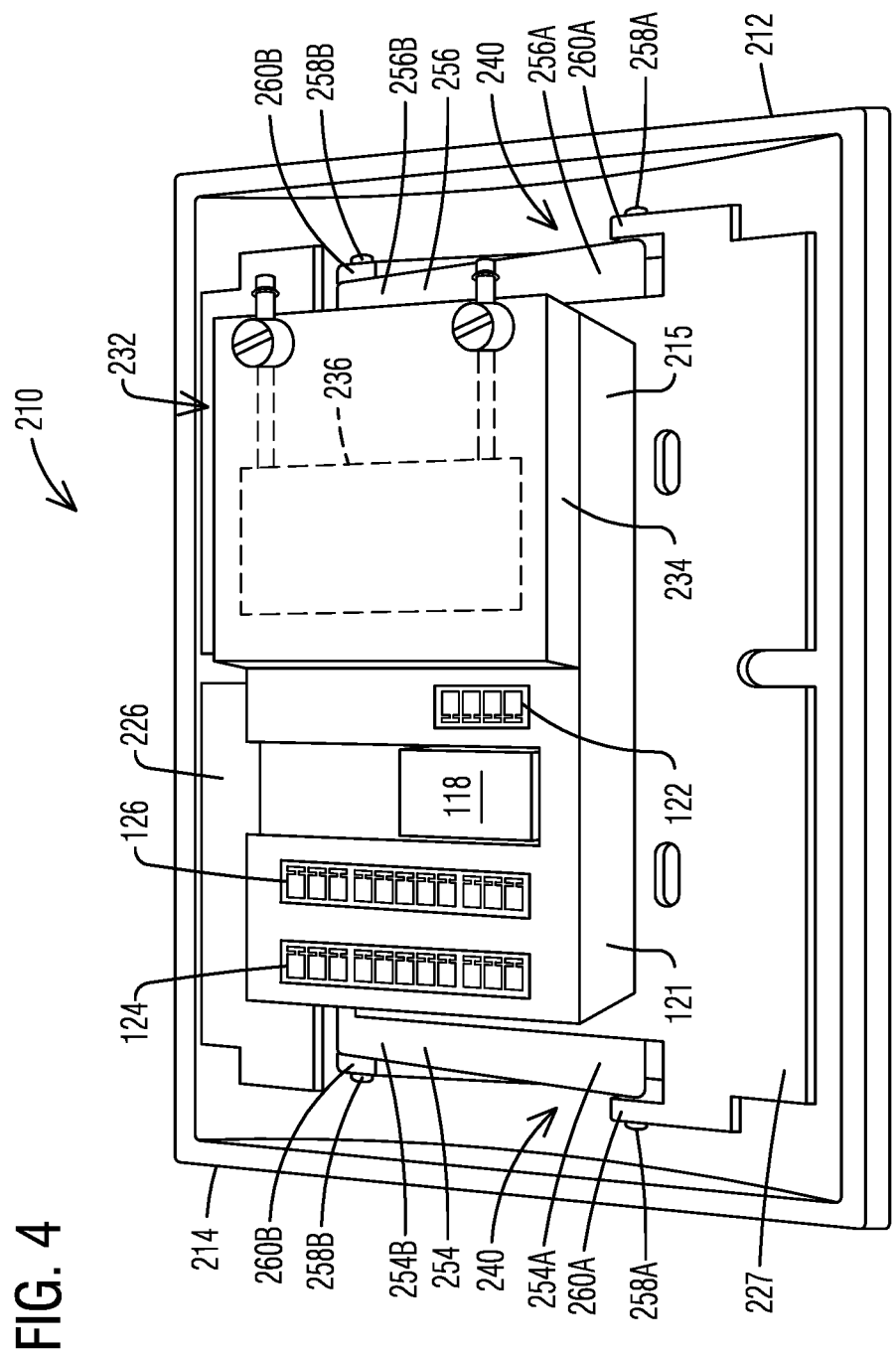
FIG. 4 is an elevational rear view of the room condition monitor with an integrated sensor module.

In reference to FIGS. 2, 3 and 4, the monitor 210 includes a first housing 215 having a plurality of interconnected side panels and a back panel that define a first interior volume 222 and opening 224. Top and bottom flanges 226, 227 that extend outwardly from the opening 224 include slots 228 through which fasteners are inserted to mount the monitor flush against the wall of a room. The housing 216, and flanges 226, 227 may be composed of a polycarbonate, plastic, or other known material.

Electrical components 230 are supported within the first housing 215 on a PCB and include at least the above-described processor 114, which further includes the router 116 as a software object thereof. The processor 114 may be a system on module (SOM) supporting the software circuitry for the memory device and router. In addition, the SOM supports alarms and a USB port. In addition, the electrical components may include an I/O board that connects the SOM to the above and below described analog and digital connections. The I/O board may further support a power source for the RCM 210.

A hinge mechanism 240 interconnects the display module 212 to the first housing 215 at the bottom flange 227. More specifically, the hinge mechanism 240 includes a first arm 254 and second arm 256 pivotally connected at respective ends 254A, 256A to the first housing 215 or to the bottom flange 227 by pins 258A and brackets 260A on opposite sides 250, 252 of the first housing 215. In the embodiment shown herein, the brackets 260A are fixed to or integrally formed with the bottom flange 227, and the pins 258A are connected to the first and second arms 254, 256. The first and second arms 254, 256 pivot about a common first pivot axis 270 to pivot the display module 212 outward and downward relative to the first housing 215, or laterally relative to the first housing 215 depending on the orientation of the RCM on a mounting surface such as a wall.

In addition, the first and second arms 254, 256 are pivotally connected to the display module 212 at ends 254B, 256B by pins 258B and brackets 260B. The brackets 260B are fixed to or integrally formed with the frame 214 of the display module 212 and the pins 258B are connected to respective ends 254B, 256B of the first and second arms 254, 256. Accordingly, the display module 212 pivots about a second pivot axis 272 relative to the first and second arms 254, 256. In this manner, an end user is able to position the display module 212 to view the screen 216 while servicing the monitor 210.

In reference to FIGS. 3 and 4, the monitor includes a sensor module 232, which includes a second housing 234 forming a second interior volume 235 in which a sensor 236 is supported. The sensor module 232 is detachably secured to the first housing 215. The first housing 215 and second housing 234 are sized to fit within a wall mounted electrical box 213 (FIG. 2). For example, the first housing 216 and second housing 234 when affixed together will fit within a 3-Gang electrical box, which meets certain international construction standard. As shown in FIG. 5B resilient clip members 244 are disposed on the second housing 234 to correspond to slots 246 in the first housing 215 for attachment of the second housing 234 to the first housing 215.

Figure 5A:
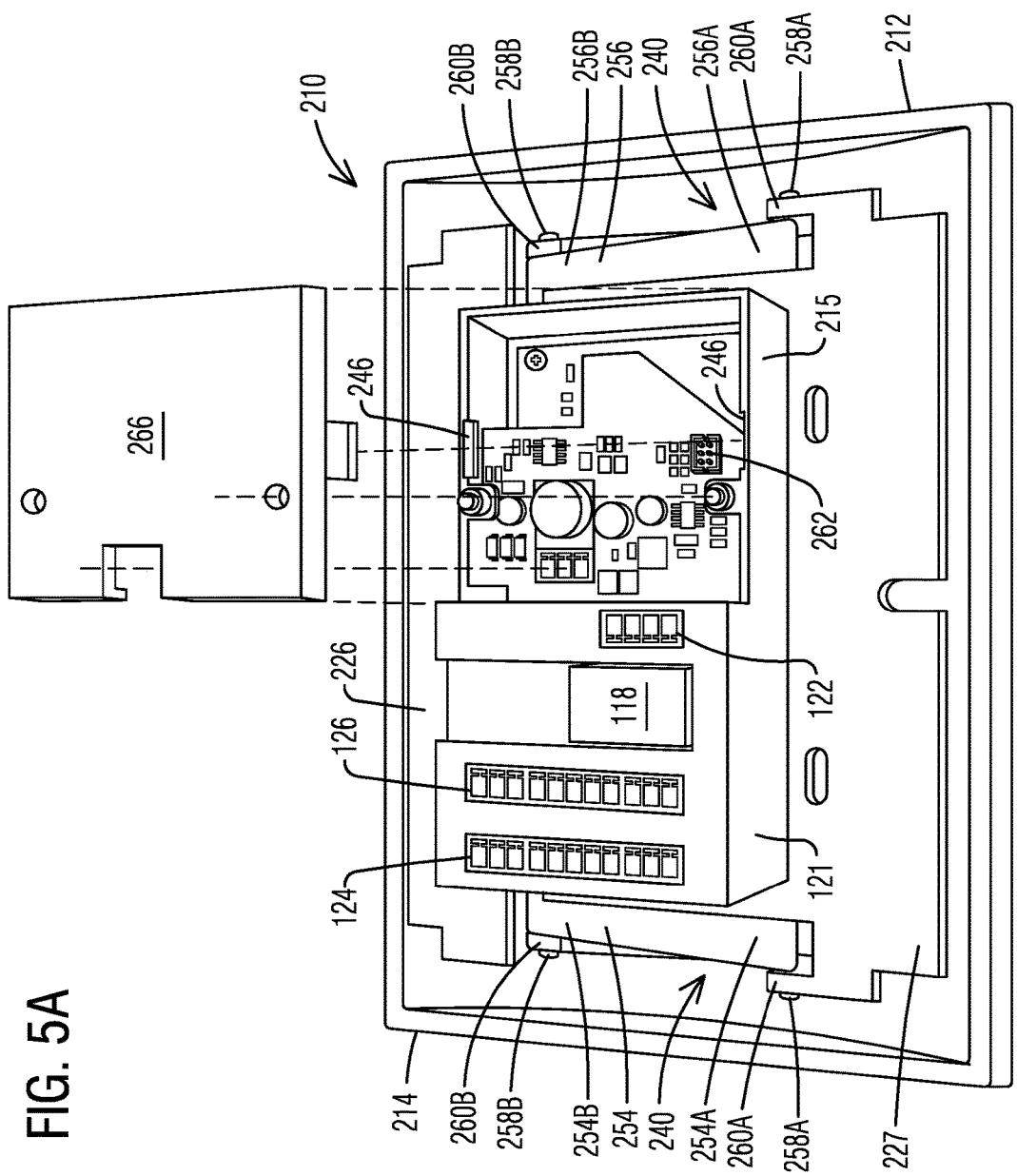
FIG. 5A is an elevational rear view of the room condition monitor with the sensor module removed and a cover plate for attachment in place of the sensor module.
Figure 5B:
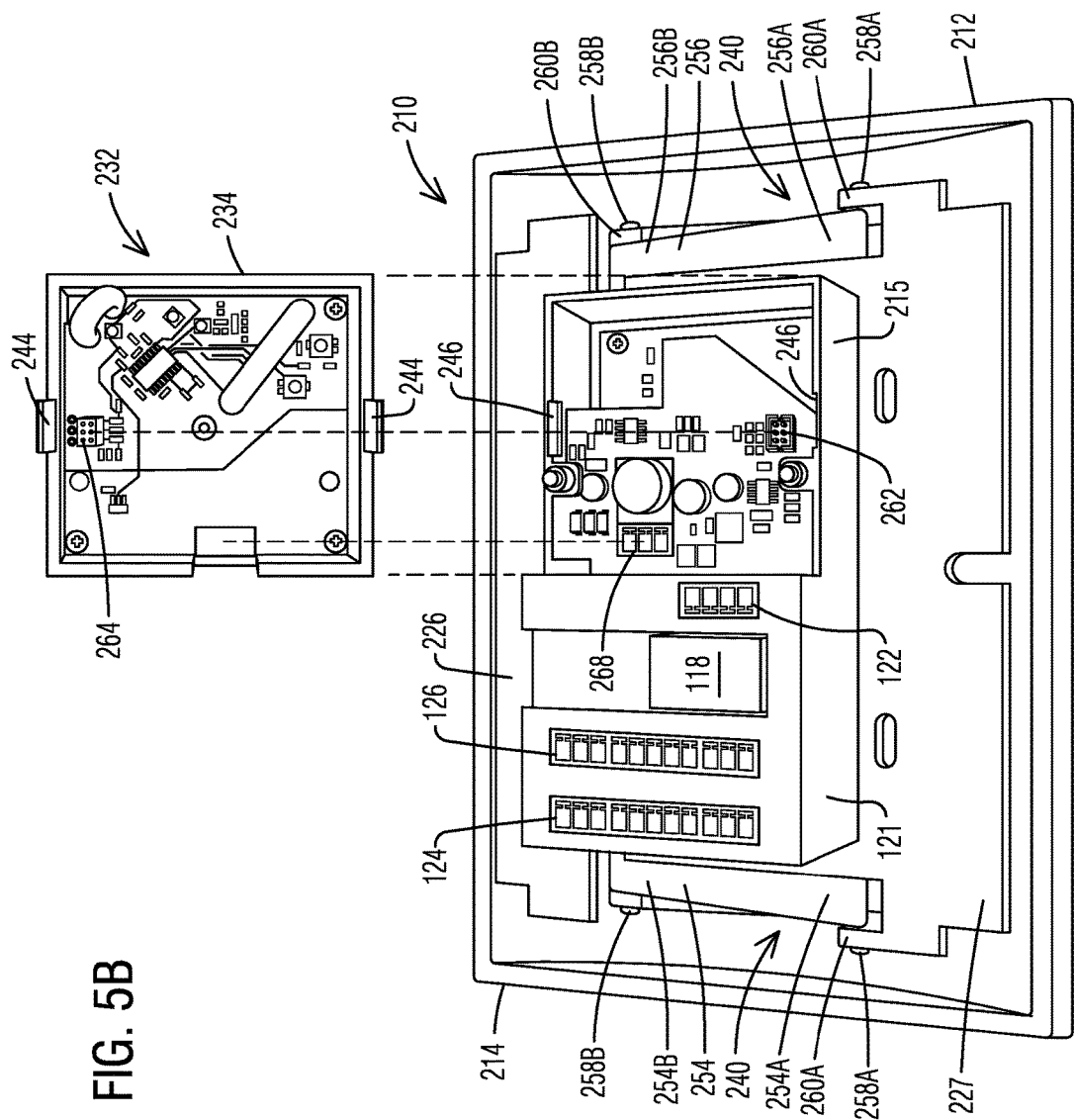
FIG. 5B is an elevational rear view of the room condition monitor with the sensor module detached.

In FIGS. 5A and 5B, the sensor module 232 is shown removed from the first housing 215. As shown, a first electrical connector 262 is on or in the first housing 215 and a second electrical connector 264 is on the sensor module 232. When the sensor module 232 is integrated with or attached to the first housing 215, the first and second electrical connectors 262, 264 provide electrical communication between the sensor 236 and processor 114. When the sensor module 232 is removed and positioned remotely relative to the first housing 216 and processor 114 a cover plate 266 is fixed to the first housing 215 to cover and protect the electrical components 230.

As shown, a third electrical connector 268 is mounted to the first housing 216 for connecting electrical lines from the sensor module 232 to the processor 114 when the sensor module 232 is positioned remotely relative to the first housing 215 and processor. In some wall installations, the interior volume of a wall may be too narrow or thin to accommodate the integrated RCM 110 including the sensor module 232; therefore, the sensor module 232 is mounted remotely, for example in a ceiling space and electrical lines are provided for the electrical interconnection of the sensor 236 and the processor 114.

Again in reference to FIGS. 4 and 5A, the RCM 110 includes the above-referenced communication connectors including a first communication connector 118 that provides a communication interface between the processor 114 (and router 116) and a BMS first network protocol 119 (FIG. 1). The first communication protocol may be BACnet/IP. A second communication connector 122 connects non-network devices or I/O devices that communicate according a second communication protocol, such as BACnet MS/TP, so router 116 and first communication connector serve as a communication interface or link to BMS according to the first network protocol, and the second network protocol. As described above, some BMSs that have been upgrade to a BACnet/IP protocol may still include legacy devices that are components of another communication network based on a BACnet MS/TP protocol. The RCM 110 is configured with the first and second communication connectors 118, 122 and embedded router 116 serve as a communication interface between the network devices of the according to the first protocol and the non-network devices.

The RCM 110 further includes the above-described I/O module 128 for connection to I/O devices 120 (FIG. 1). In addition to the network connectors, the I/O module includes analog connectors 124 and digital connectors 126 for electrical or signal communication between devices 120 and the processor 114 and/or router 116 as described above.

Figure 6:
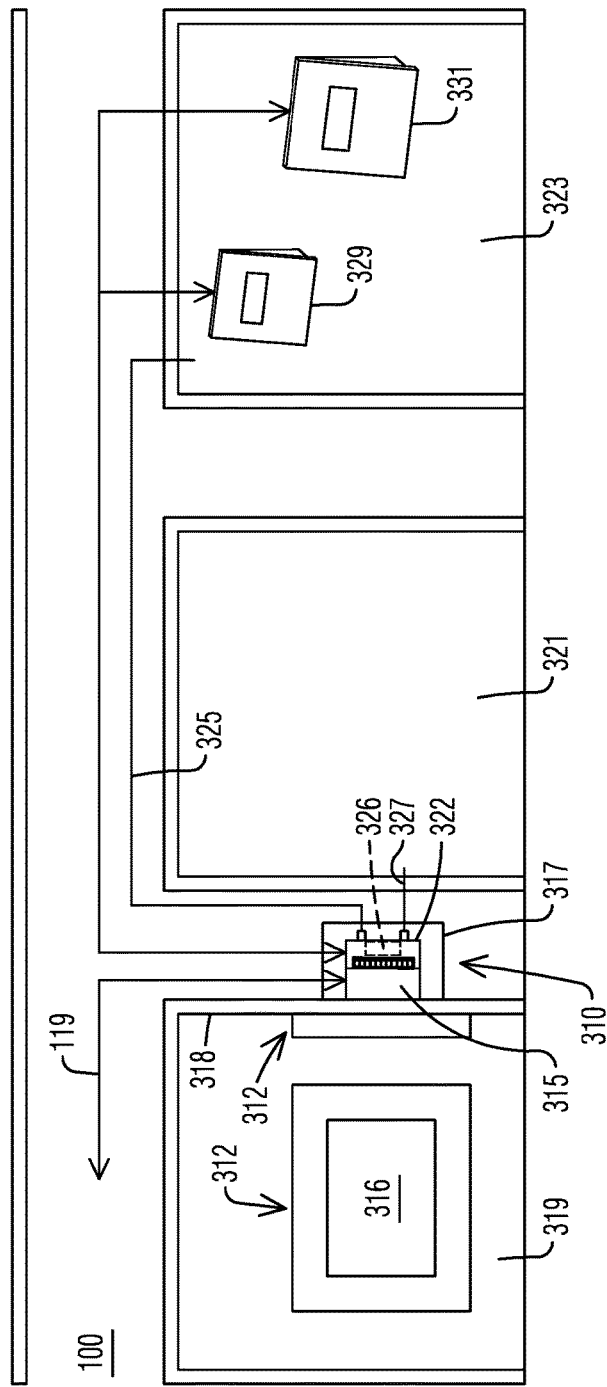
FIG. 6 is a schematic illustration of the room condition monitor with the integrated sensor module attached to a display module and the monitor is connected to and in signal communication a BMS communication network and multiple room condition monitors.

With respect to FIG. 6 an RCM 310 is shown mounted to a wall surface of a hallway 319. In this example, and the embodiments shown in FIGS. 7 and 8, the sensor module 322 includes a pressure transducer; however, the invention is not limited to pressure transducers and may encompass other types of sensors that detect different room conditions. As shown, the RCM 310 includes integrated sensor module 322 mounted to the housing 315 of the RCM 310, wherein the sensor module 322 and housing 315 are disposed within an electrical box 317 and the display module 312 is flush against the surface a wall 318 of a hallway 319.

In this embodiment, the pressure transducer may be configured to detect a pressure differential between and anteroom 321 and a main room 323, which may be for example a hospital isolation room. Accordingly, sensor 326 is in fluid flow communication with the anteroom 321 and the main room via airflow lines 325, 327 to monitor the pressure in each room 321, 323 and/or the differential between the two rooms 321, 323.

As described above, the sensor 326 is in signal communication with a processor 114 which translates analog signals from the sensor to a digital data signal representing the detected pressures and/or pressure differential. The router 116 then generates a data package including a destination address and data representing a pressure in one or both rooms 321, 323 and/or a pressure differential between the rooms 321, 323 and transmits this data via a first communication connector 118 over a BMS communication network 100 according to a first network protocol 119, which for example may be BACnet/IP.

As further shown in FIG. 6, the main room 323 is provided with a temperature sensor 329 and humidity sensor 331, which are in signal communication with the processor 114 and/or router 116. The sensors 329, 331 may be configured to generate analog signals or digital signals that are transmitted to the RCM 310, which may have an I/O module as describe including analog and/or digital connectors 124, 126 for communication of data relative to detected room conditions. Alternatively, the sensors 329, 331 may be include or be linked to one or communication interfaces to transmit room condition data via a second network protocol, for example BACnet MS/TP. The RCM 310 includes the second communication connector configured 122 to receive or transmit data according to the second network protocol. In addition, the router 116 is programmed to generate and transmit one or more data packages over the BMS network according to the first protocol, and transmit data packages according to the second network protocol.

The display screen 316 may be display information representing detected room conditions such as pressure, a pressure differential, temperature or relative humidity associated with the main room 323. In addition, an end user can access the BMS via the display module 312 and display screen 316 and to obtain information regarding other areas of a building connected to the BMS communication network according to the first network protocol 119.

Figure 7:
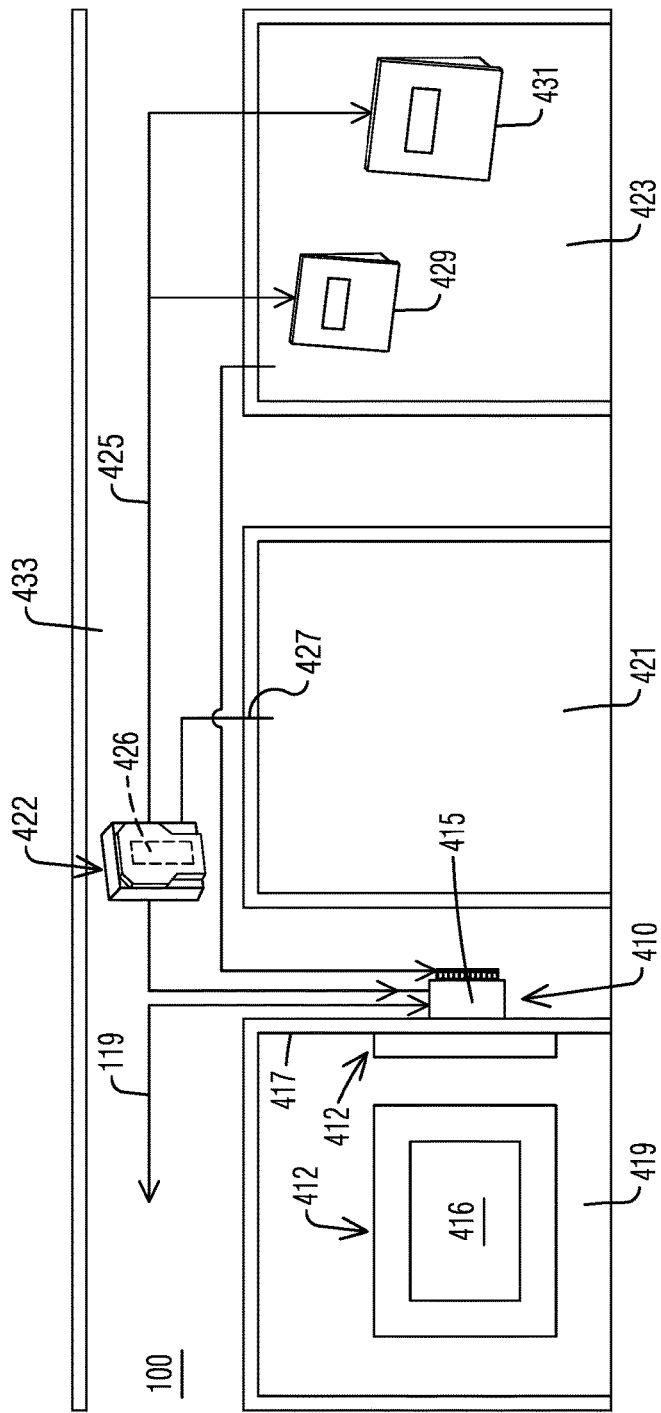
FIG. 7 is a schematic illustration of the room condition monitor with sensor module detached and remotely positioned relative to the display module of the monitor.

FIG. 7 is a schematic illustration of the RCM 410 mounted to a wall 417 having a narrow interior volume such that the sensor module 422 is detached from the first housing 415 and positioned remotely in a ceiling space 433. In the case of a pressure transducer, air flow lines 425, 427 are provided for fluid flow communication with the sensor module 422 and rooms 421, 423. Of course the sensor module 422 is not limited to a pressure transducer and could another type of room condition sensor. As shown, the sensors 429, 431 are in signal communication with the RCM 410 as described above with respect to FIG. 6. The display screen 416 may be display information representing detected room conditions such as pressure, a pressure differential, temperature or relative humidity associated with the main room 423. In addition, an end user can access the BMS via the display module 412 and display screen 316 and to obtain information regarding other areas of a building connected to the BMS communication network according to the first network protocol 119.

Figure 8:
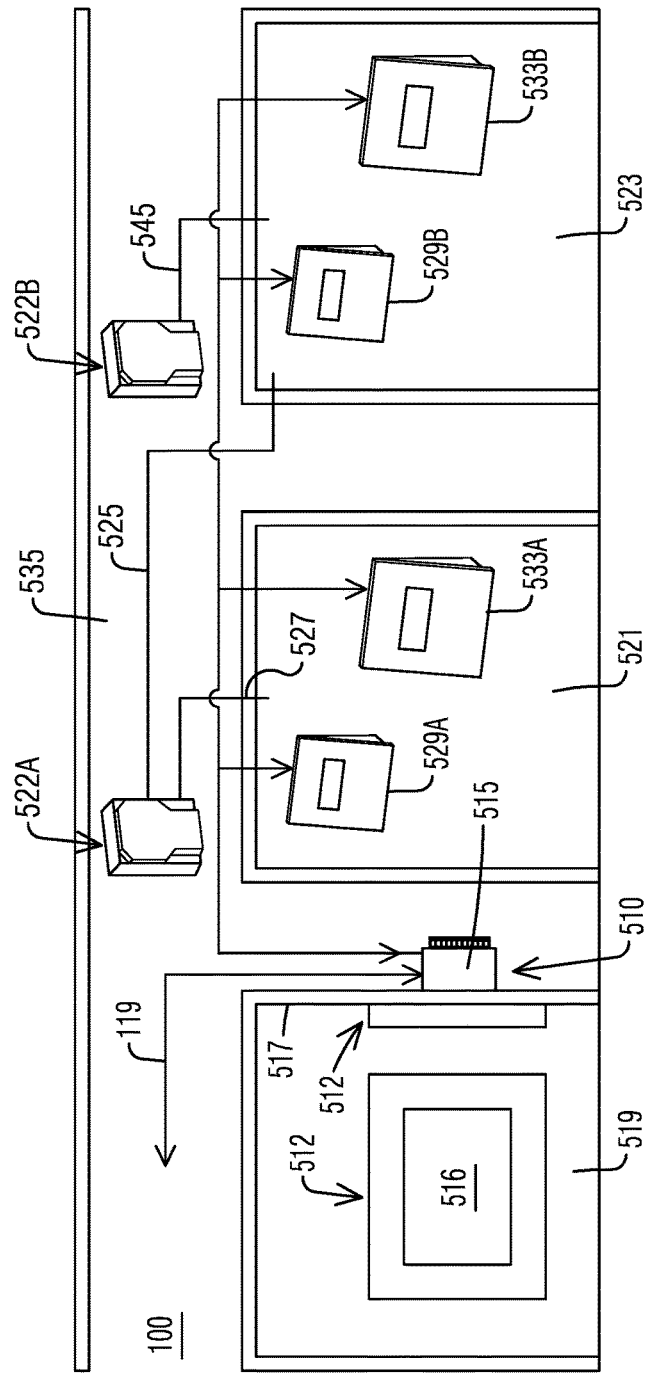
FIG. 8 is a schematic illustration of the room condition monitor connected to multiple sensors in multiple rooms and in signal communication with a BMS communication network.

With respect to FIG. 8, the RCM 510 may include two remotely positioned sensor 522A, 522B, including pressure transducers, in fluid flow communication with an anteroom 521 and main room 523 to detect and monitor the pressure and/or pressure differential in each room 521, 523. Air flow lines 525, 527, 545, provide fluid flow communication between sensors modules 522A, 522B and rooms 521, 523. In addition, temperature sensors 529A, 529B and humidity 531A, 531B may be provided in each room 521, 523 in signal communication with the RCM 510 as described with respect to FIG. 6. Such an arrangement provides for an RCM that enables monitoring multiple rooms for multiple room conditions in each room 521, 523. The display screen 516 may be display information representing detected room conditions such as pressure, a pressure differential, temperature or relative humidity associated with the anteroom 521 and main room 523. In addition, an end user can access the BMS via the display module 512 and display screen 516 and to obtain information regarding other areas of a building connected to the BMS communication network according to the first network protocol 119.

Figure 9A:
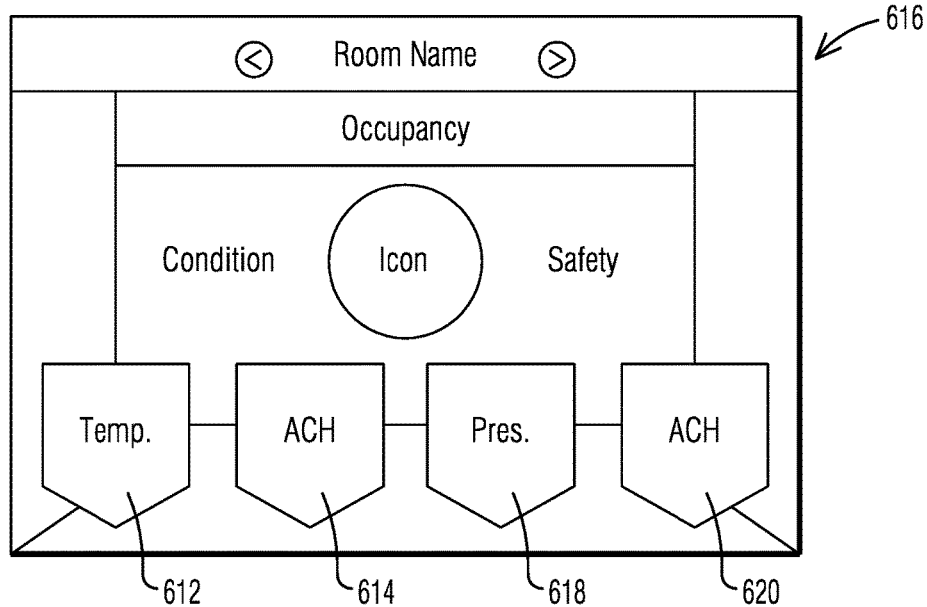
FIG. 9A is a first schematic illustration of a display screen according to aspects of the invention.
Figure 9B:
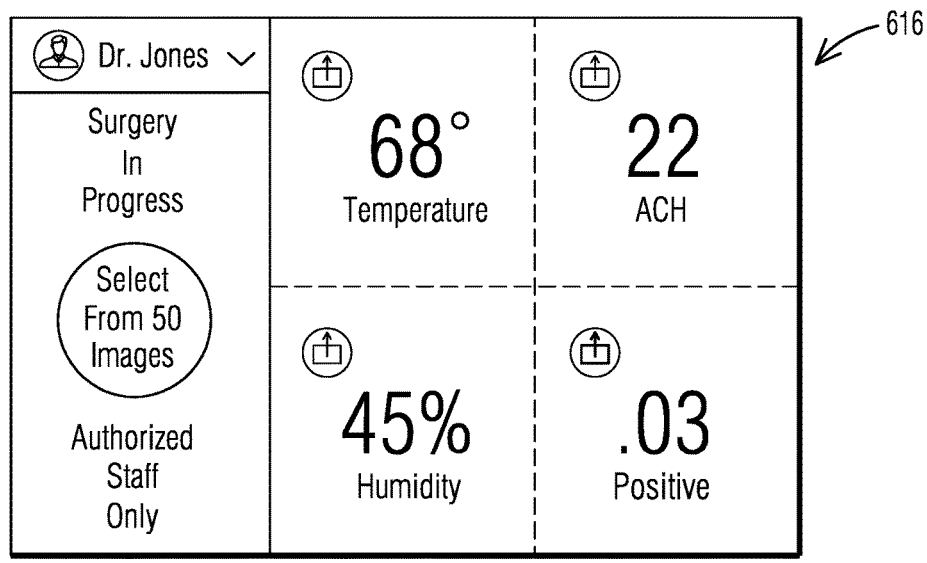
FIG. 9B is a second schematic illustration of a display screen according to aspects of the invention.

To that end, FIGS. 9A and 9B are examples of an RCM screen 616 that displays different room conditions associated with a particular room. The BMS communication network may require entry of a password to access data associated any room within a building that is being monitored and is connected to the BMS communication network either through the RCM or through other communication network devices. Once connected, an end user may enter a room identification code, like a room number and the screen 616 may display a menu as shown in FIG. 9A that includes multiple icons 612, 614, 618, 620 each associated with a room condition being monitored such as temperature, relative humidity, pressure or air changer per hour (ACH).

In addition, the screen may display the different room conditions upon command as shown in FIG. 9B, which also includes room status information such as occupancy and any event that may be occurring or will occur in the room. For example, such room status information may identify an individual who has reserved the room for a certain day and time period and the nature of the event (surgery) that is taking place for that day and time period. In addition, one may be able to access data associated with room condition thresholds and change the thresholds or verify that the selected room condition is selected is within such thresholds or adjust the selected room condition to fall within such thresholds.

A variety of optional features may easily be interfaced with the described new and novel monitor and system described herein, such as set point overrides. For example, an occupancy sensor may be used to prevent the display monitors from being used to change room conditions if a patient is in the room and requires a particular pressure setting. Another example is where large energy use is critical in certain spaces, such as with fume hoods in a laboratory. Energy efficiency settings in the room monitor system may possibly change the pressure characteristics resulting in fume escaping from the fume hood. In such a case, the system could be configured to monitor contamination levels to prevent energy efficiency mode when a fume hood is in use. Wireless communications (Wi-Fi, Bluetooth, cellular, etc.) may be used either instead of, or in conjunction with, Ethernet connectivity. Other features may be added as required without departing from the scope and spirit of the presently described system.

While the preferred embodiments of the present invention have been shown and described herein, it will be obvious that such embodiments are provided by way of example only. Numerous variations, changes and substitutions will occur to those of skill in the art without departing from the invention herein. Non-limiting examples include a component that is described above as being attached to one part of the apparatus may alternatively be attached to a different part of the apparatus in other embodiments. Parts described as being indirectly connected may be connected directly to each other, and vice versa. Component parts may be assembled from individual pieces or may be integrally formed as a single unit. Alternative types of connectors and alternative materials may be used. The apparatus may be used with other types of computing elements. Accordingly, it is intended that the invention be limited only by the spirit and scope of the appended claims.

The invention claimed is:

1. A room condition monitoring device, comprising:
a first housing defining a first interior volume, wherein the first housing supports operating electrical components;
a display module including a frame attached to the first housing and a display screen affixed to the frame and the display screen is in signal communication with one or more of the electrical components;
a first electrical connector mounted to the first housing; and,
a sensor module detachably securable to the first housing wherein the sensor module comprises:
a second housing defining a second interior volume;
a sensor supported within the second interior volume and the sensor is configured to detect a condition of a room in the building;
a second electrical connector on the sensor module and detachably securable to the first electrical connector, wherein the second electrical connector is in electrical communication with the sensor and the operating electrical components to provide signal communication there between, when the first and second electrical connectors are secured together and the sensor module is affixed to the first housing;
wherein the operating electrical components comprise a processor in signal communication with the sensor and the display screen, and the processor is configured to generate data associated with the condition of the room detected by the sensor.

2. The room condition monitor of claim 1, wherein the sensor is a pressure transducer to detect a pressure within the room or a pressure differential in the room relative to another room in the building.

3. The room condition monitor of claim 2 wherein the sensor module further comprises a first inlet portal in fluid communication with a first room and second inlet portal in fluid communication with a second room, and the pressure transducer is configured to detect a pressure differential between the first and second rooms.

4. The room condition monitor of claim 1, wherein the first housing and sensor module when secured together are dimensioned to fit within an electrical box mounted to a building wall frame.

5. The room condition monitor of claim 1, further comprising a hinge mechanism connected to the first housing and the display module wherein the hinge mechanism has a first arm pivotally connected to a first side of the first housing and the first arm is connected to the display module and a second arm pivotally connected to a second side of the first housing and second arm to the display module, wherein the first arm and second arm share a common first pivot axis on the first housing to displace the display module outward and downward or upward, or outward and laterally relative to an opening of the first housing depending on the orientation of the display module to a servicing position.

6. The room condition monitor of claim 5, further comprising an electrical line connecting the display to one or more of the electrical components that is extendible when the display module moved to a servicing position and the electrical line remains connected to the display screen when the display module is in the servicing position.

7. The room condition monitor of claim 1, wherein the display screen includes a projected capacitive touchscreen.

8. A room condition monitor, comprising:
a housing defining an interior volume and an opening to the interior volume, wherein the housing supports operating electrical components within the interior volume;
a display module including a frame and a display screen attached to the housing to cover the opening when in an operating position and the display module is selectively movable relative to the opening between the operating position and a servicing position wherein the opening is exposed for access to the operating electrical components;
a sensor in signal communication with one or more of the electrical components and the sensor detects a condition within a room of a building; and,
a hinge mechanism connected to the housing and the display module wherein the hinge mechanism has a first arm pivotally connected to a first side of the housing and the first arm is connected to the display module and a second arm pivotally connected to a second side of the housing and second arm is connected to the display module, wherein the first arm and second arm share a common first pivot axis on the housing to displace the display module outward and downward or upward, or outward and laterally relative to the opening of the housing depending on the orientation of the display module and the housing.

9. The room condition monitor of claim 8, wherein first arm and second arm share a common second pivot axis on the display module.

10. The room condition monitor of claim 8, further comprising an electrical line connecting the display screen to one or more of the electrical components that is extendible when the display module is in the servicing position and the electrical line remains connected to the display screen when the display module is in the servicing position.

11. The room condition monitor of claim 8, wherein the housing is a first housing including a first electrical lead supported therein and the sensor is a component of a sensor module detachably securable to the first housing and the sensor module comprises:
a second housing defining a second interior volume, and the sensor is supported within the second interior volume; and,
a second electrical lead on the sensor module in electrical contact with the sensor and the detachably connected to the first electrical lead to provide signal communication between the sensor and one or more of the electrical components.

12. The room condition monitor of claim 11, wherein the sensor is a pressure transducer to detect a pressure within the room or a pressure differential in the room relative to another room in a building.

13. The room condition monitor of claim 11 wherein the sensor module further comprises a first inlet portal in fluid communication with a first room and second inlet portal in fluid communication with a second room, and the pressure transducer is configured to detect a pressure differential between the first and second rooms.

14. The room condition monitor of claim 12, wherein the first housing and sensor module when secured together are dimensioned to fit within an electrical box mounted to a wall frame of a room in a building.

15. A room condition monitoring system, comprising:
a housing defining an interior volume and an opening to the interior volume, wherein the housing supports operating electrical components;
a display module including a frame attached to the housing and a display screen affixed to the frame and the display screen is in signal communication with one or more of the operating electrical components;
a room condition sensor in signal communication with the electrical components to detect a condition within a room of the building, and the sensor transmits signals to one or more of the electrical components, and the signals are indicative of a detected condition of a room in a building; and,
wherein the operating electrical components comprise a processor configured to process the signals received from the sensor and generate data representing the detected condition of the room; and,
at least one communication connector including a BACnet/IP interface in signal communication with a building management system (BMS) including a BMS communication network according to a BACnet/IP protocol to transmit the data from the processor over the BMS network according to the BACnet/IP protocol or receive signals over the BMS network according the BACnet/IP protocol.

16. The system of claim 15, wherein the operating electrical components comprise a router, and the BMS includes a plurality of I/O devices one or more of which is in signal communication with the processor or router, and the router is configured to transmit one or more data packages according to the BACnet/IP protocol responsive to signals received from the one or more I/O devices.

17. The system of claim 16, further comprising one or more analog I/O connections and signals received from the one or more I/O devices are analog signals transmitted to the processor which generates data based on the signals from the one or more I/O devices and the router transmits one or more data packages according to the BACnet/IP protocol in response to the data generated by the processor and the signals received from the one or more I/O devices.

18. The system of claim 16, further comprising one or more digital I/O connectors and signals received from the one or more I/O devices are digital signals transmitted to the router which transmits one or more data packages according to the BACnet/IP protocol in response to the received digital signals.

19. The system of claim 16, wherein the BACnet/IP protocol is a first network protocol and the signals from the one or more I/O devices are transmitted to the router as data packages according to a second network protocol that is different than the first network protocol, and the router is configured to transmit one or more data packages according to the first network protocol in response to the signals from the one or more I/O devices.

20. The system of claim 19, wherein the first network protocol is BACnet/IP and the second network protocol is BACnet MS/TP.

21. The system of claim 17, wherein the room condition sensor is a pressure transducer that detects a pressure in the room or pressure differential between the room and another room in the building.

22. The system of claim 21, wherein the one or more I/O devices is in analog signal communication with the processor and is a room condition monitor that monitors a room condition, within the room or in another room, other than pressure or a pressure differential.

23. The system of claim 22, wherein the one or more I/O devices in signal communication with the processor is a temperature monitor or a room humidity monitor.

24. A room condition monitoring system, comprising:
a housing defining an interior volume and an opening to the interior volume, wherein the housing supports operating electrical components;
a display module including a frame attached to the first housing and a display screen affixed to the frame and the display screen is in signal communication with one or more of the electrical components
a room condition sensor in signal communication with the electrical components to detect a condition within a room of a building, and the sensor transmits signals to one or more of the electrical components, and the signals are indicative of a detected condition of the room; and,
wherein the operating electrical components comprise:
a processor configured to process the signals received from the sensor and generate data representing the detected room condition; and,
a router that is in signal communication with the processor and a BMS communication network of the building according to a first network protocol and the router is configured to transmit one or more data packages according to the first network protocol based on the data received from the processor; and,
wherein the BMS communication network includes a plurality of I/O devices one or more of which is in signal communication with the processor or router, and the router is configured to transmit one or more data packages according to the first network protocol based on signals received from one or more of the I/O devices at the processor or router;
at least one communication connector including a first network protocol interface and the connector is in signal communication with the router, wherein the connector is configured to transmit the data packages from the router over the BMS communication network according to the first network protocol.

25. The system of claim 24, wherein signals received from the one or I/O devices comprise analog signals transmitted to the processor which generates data based on the signals from the one or more I/O devices and the router transmits one or data packages according to the first network protocol responsive to the data generated by the processor in response to the analog signals from one or more of the I/O devices.

26. The system of claim 24, further comprising one or more digital I/O connectors and signals received from the one or I/O devices are digital signals transmitted to the router which transmits one or data packages according to the first network protocol responsive to the digital signals from the one or more I/O devices.

27. The system of claim 24, wherein the at least one communication connector is a first connector and the system further comprises a second communication connector including a second network protocol interface and signals from the I/O devices are transmitted to the router according to a second network protocol that is different than the first network protocol, and the router is configured to transmit one or more data packages according to the first network protocol and/or transmit one or more data packages according to the second network protocol.

28. The room condition monitor of claim 26, wherein the first network protocol is BACnet/IP and the second network protocol is BACnet MS/TP.

29. The system of claim 24, wherein the sensor is a pressure transducer that detects a pressure in the room or pressure differential between the room and another room in the building.

30. The system of claim 29, wherein the one or more I/O devises in analog signal communication with the processor is a room condition monitor that monitors a room condition, within the room or in another room, other than pressure or a pressure differential.

31. The system of claim 30, wherein the one or more I/O device in analog signal communication with the processor is a temperature monitor or a room humidity monitor.

32. The system of claim 27, wherein the router is configured transmit one or more data packages according to the second network protocol via the second communication connector in response to or based on data packages received via the first communication connector according to the first network protocol.

\* \* \* \* \*